United States Patent [19]
Reid et al.

[11] 4,076,408
[45] Feb. 28, 1978

[54] COLLATING DOCUMENT FEEDER WITH MULTIPLE FEED DETECTOR

[75] Inventors: Michael Gerald Reid, Rochester; Leroy Ellery Burlew, Clyde; David Charles Hogan, Rochester, all of N.Y.

[73] Assignee: Eastman Kodak Company, Rochester, N.Y.

[21] Appl. No.: 671,758

[22] Filed: Mar. 30, 1976

[51] Int. Cl.² .............................................. G03G 21/00
[52] U.S. Cl. ...................................... 355/14; 271/258
[58] Field of Search .......................... 355/14; 340/259; 271/258; 235/92 SB, 92 CA

[56] References Cited
U.S. PATENT DOCUMENTS

| | | | |
|---|---|---|---|
| 3,412,993 | 11/1968 | Giori | 235/92 SB |
| 3,845,282 | 10/1974 | Mattson | 235/92 CA |
| 3,983,367 | 9/1976 | Kondo et al. | 235/92 CA |

*Primary Examiner*—A. D. Pellinen
*Attorney, Agent, or Firm*—G. H. Childress

[57] ABSTRACT

A collating document feeder with a multiple-feed detector for use on a convenience copier. The feeder circulates the document sheets one-after-another for presentation to the copier once, and recirculates the sheets one-after-another for presentation to the copier again, thereby to present the sheets for copying in an order that facilitates collation of the final copies. The multiple-feed detector compares the number of presentations during circulation with the number of presentations during recirculation, to detect the occurrence of multiple feeds. The number of presentations can be determined, for example, by counting the number of exposures, or the number of times document sheets are fed.

8 Claims, 4 Drawing Figures

COLLATING DOCUMENT FEEDER WITH MULTIPLE FEED DETECTOR

CROSS-REFERENCE TO RELATED APPLICATIONS

Reference is made to U.S. application Ser. No. 523,610, entitled RECIRCULATING SHEET FEEDER, filed in the name of Mathew J. Russel on Nov. 13, 1974, and refiled as U.S. application Ser. No. 647,683 on Jan. 8, 1976; to U.S. application Ser. No. 671,865, entitled ORIGINAL DOCUMENT REARRANGEMENT APPARATUS FOR USE IN RECIRCULATING FEEDERS, filed in the name of Michael G. Reid, et al on even date herewith, said application having been converted to Defensive Publication No. T957,006, published Apr. 5, 1977; and to U.S. application Ser. No. 671,867, entitled AUTOMATIC TRANSFER FROM COLLATE TO NON-COLLATE MODE OF RECIRCULATING FEEDER AND COPIER OPERATION, filed in the name of Leroy E. Burlew, et al on even date herewith.

BACKGROUND OF THE INVENTION

1. Field of the Invention

The present invention relates to reproduction apparatus; and to feeders for presenting an original, comprising a set of individual sheets, to such apparatus in a manner that facilitates collation of the reproductions into sets corresponding to the original. More specifically the invention relates to mechanisms for determining when the feeder malfunctions in the sense that it presents multiple sheets to the apparatus all at the same time. Feeders of this type include the so-called "recirculating" and "collating" document feeders, which have particular utility on convenience copiers.

2. Brief Description of the Prior Art

It is well known in the prior art to provide convenience copiers with document feeders that present the individual document sheets to the copier, one-after-another, in a manner suitable for producing collated copies without a sorter. Examples are disclosed in U.S. Pat. Nos. RE 27,976; 3,552,739; 3,556,511 and 3,709,595. It should be apparent from the above-mentioned types of structures that recirculating collating feeders can provide significant improvements in the total copying operation, especially in regard to the convenience and economics thereof. At the same time, however, it becomes more critical with such feeders that they operate repeatedly without malfunction, or at least that any serious malfunction be readily detectable and easily corrected. Collating feeders have not been made commercially available to date and, although the reasons are not known, it may be that the problems associated with malfunctions have played a part in delaying their introduction.

It also is known in the prior art to provide sensors and control apparatus for use in conjunction with copiers or document feeders to prevent malfunctions or to act as alerting devices when one or more possible malfunctions occur. Noteable examples are disclosed in U.S. Pat. Nos. 3,249,354; 3,819,266; 3,882,308; 3,920,328; 3,928,772 and 3,932,755. Devices of this sort can be used with collating feeders and will prevent or detect certain malfunctions. Still, however, they are not entirely suitable for all purposes. A particularly difficult problem, for example, relates to malfunctions involving the simultaneous feeding of a plurality of sheets. The present invention is directed to this problem, and provides a particularly attractive solution that is not available from the prior art.

SUMMARY OF THE INVENTION

In accordance with the present invention, a feeder for presenting originals to reproduction apparatus, in a manner suitable for facilitating the collation of the reproductions, is provided with improved means for detecting and handling the problem of multiple feeds. The original, comprising a set of individual sheets, is circulated and recirculated for presentation to the apparatus one-sheet-after-another. Multiple feeds are detected by comparing the number of presentations during a circulation with the number of presentations during a recirculation, and some further action is taken, such as shutdown of the feeder, whenever the number of presentations on circulation and recirculation differ.

In accordance with a preferred embodiment of the invention, a recirculating collating feeder is employed with a convenience copier. Detectors are provided for determining the number of times sheets are circulated for copying the set once, and the number of times sheets are recirculated for copying the set again. These numbers are compared, and, when they differ, a multiple feed is indicated. More specifically, the preferred embodiment includes two sources of information: a counter which is incremented each time sheets are fed to an exposure position, and a set-completed detector. The set-completed detector initiates a comparison between the number counted during a circulation and the number counted during a recirculation. When such numbers differ, the feeder is shut down.

In accordance with other embodiments, the multifeed condition can be determined by counting the number of exposures during circulation and recirculation, or perhaps by measuring the time to circulate and recirculate.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
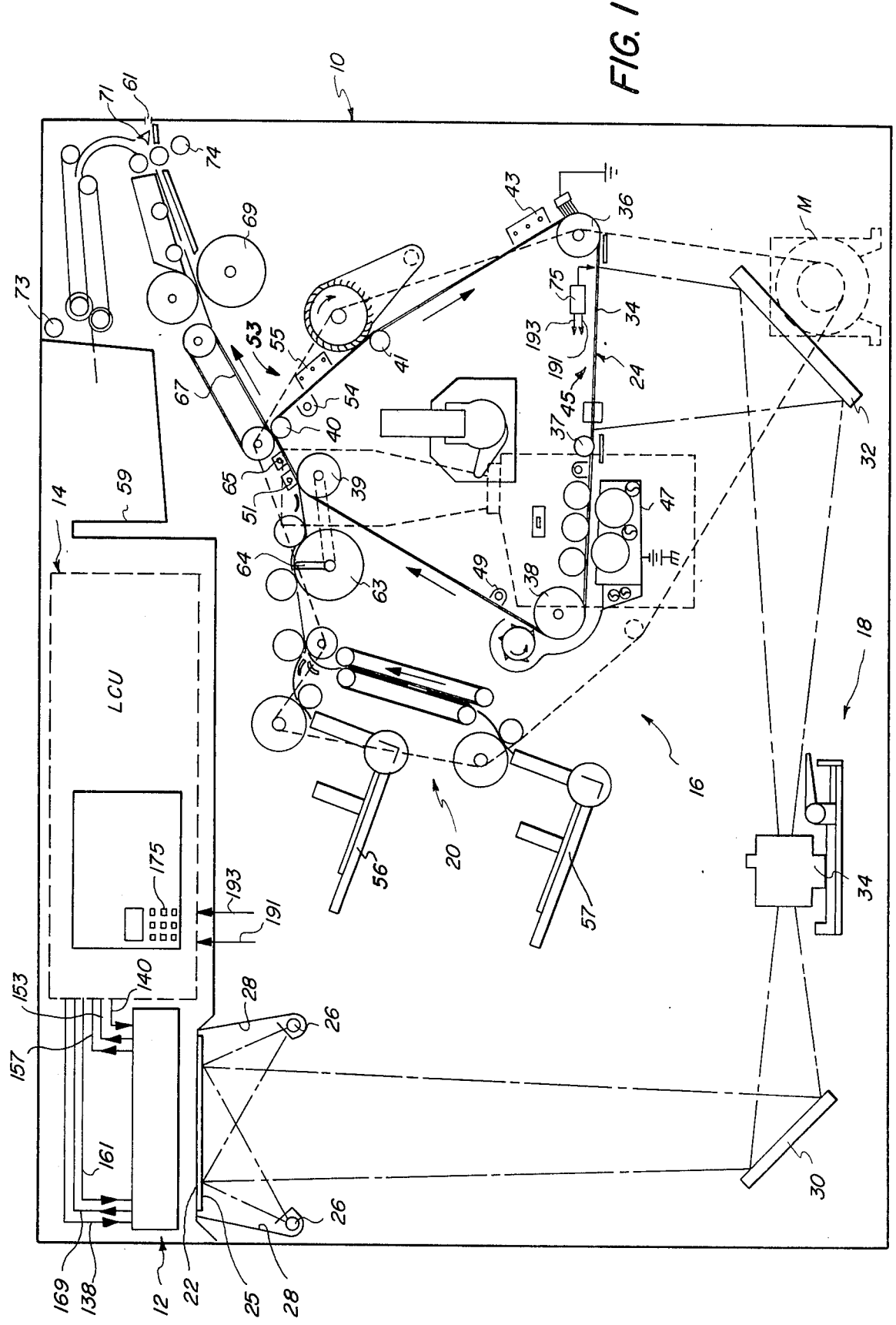
FIG. 1 is a schematic representation of a convenience copier including a process section, a logic and control unit, and a recirculating collating document feeder.

Referring now to the drawings, and especially to FIG. 1, a reproduction device 10 is depicted with a feeder 12 and a logic and control unit (LCU) 14. For the purpose of this description, the feeder will be described as if it were a separate attachment. It should be apparent, however, that the feeder and apparatus could be an integral structure, and that the LCU could be incorporated entirely in the feeder, or shared between the feeder and the rest of the apparatus.

The reproduction apparatus is depicted as a convenience copier including a process section 16, a projection device 18 and a copy-support handling mechanism 20.

The projection device is of the full-frame, flash-exposure type, and includes suitable structure for projecting an image from an object or exposure plane 22, accessible from the exterior of the apparatus, to an image or photoconductor plane 24 of the process section. In FIG. 1 this structure is depicted as including a platen 25, defining the object plane, a pair of Xenon flash lamps 26 and cooperating reflectors 28, for illuminating the object plane, a pair of planar mirrors 30 and 32, and a projection lens 34. Additional details of the projection apparatus are set forth in the following patent and commonly assigned copending U.S. patent applications, Ser. No. 654,819 entitled LENS SHIFT MECHANISM, filed in the names of John W. Ward and Richard K. Leinbach on Feb. 3, 1976; Ser. No. 569,507 entitled ILLUMINATION ARRANGEMENT PROVIDING FOR INTERFRAME FLASHDOWN, filed in the name of Alfred J. Michaloski on Apr. 19, 1975, now U.S. Pat. No. 3,998,541, issued Dec. 21, 1976; and U.S. Pat. No. 3,914,047 issued Oct. 21, 1975 in the name of Hunt, et al.

The process section 16 is of the web/transfer type and includes a photoconductor 34 trained to run in a closed-loop path about six web-constraining rollers 36, 37, 38, 39, 40, and 41. Suitable tracking apparatus for this purpose is disclosed in the following patent and commonly assigned, copending U.S. patent applications Ser. No. 504,778, entitled POSITIONALLY CONSTRAINING WEB SUPPORT, filed in the names of Thaddeus Swanke and Richard T. O'Marra on Sept. 10, 1974, now U.S. Pat. No. 3,986,650; Ser. No. 504,771 entitled WEB TRACKING APPARATUS, filed in the names of Thaddeus Swanke, Michael S. Montalto and John E. Morse on Sept. 10, 1974, now U.S. Pat. No. 3,974,952; and U.S. Pat. No. 3,913,813, entitled WEB SUPPORT WITH CASTERED AND GIMBALLED ROLLER issued on Oct. 21, 1975.

Roller 36 is coupled to a drive motor M and drives the photoconductor in a clockwise direction in its closed loop path whenever the motor is connected to an appropriate source of potential. This movement of the photoconductor causes successive image frames sequentially to pass adjacent a series of electrophotographic work stations, which, for the purpose of this disclosure, can be described as follows:

A charging station 43 at which the photoconductor is sensitized by receiving a uniform electrostatic charge;

an exposing station 45 at which the photoconductor receives a latent electrostatic image by projecting a light pattern representing the object onto the sensitized photoconductor;

a developing station 47 at which the latent electrostatic image is rendered visible by the application of marking particles usually called toner;

a post development erase station 49 at which any undeveloped latent image is removed by illuminating the photoconductor;

a transfer station 51 at which the developed and visible image is electrostatically transferred from the photoconductor to a copy support as will become more apparent hereinafter; and a cleaning station 53, including erase and discharging devices 54 and 55, respectively, at which the photoconductor is cleaned of any residual marking particles or electrostatic charge.

The copy handling mechanism 20 is suitable for moving copy supports, such as paper, in a path from either of two supply hoppers 56 and 57, through the transfer station 51, and on to either a delivery hopper 59, where the copies are deposited for retrieval by the operator, or an exit 61, where the copies are presented for finishing operations such as stapling and stacking. Additional stations located along this path of movement include the following:

A registration device 63, including a sheet-retarding finger 64, for establishing proper alignment between the copy supports in the copy handling mechanism and the image frames of the photoconductor;

a discharging device 65 for reducing electrostatic attraction between the copy supports and the photoconductor in order to facilitate separation of the copy supports from the photoconductor;

a vacuum transport 67 for supporting the copies from a side thereof opposite the most recently received visible image;

a fusing device 69 for permanently fixing the marking particles to the copy support by the application of heat and pressure;

a sheet diverter 71 for directing the copy supports to a selected one of the delivery hopper 59 or exit 61; and sheet conditioners 73 and 74 for removing undesireable static electricity remaining on the copy supports.

The logic and control unit 14 coordinates operation of the various work and additional stations with movement of the copy supports and the latent and visible images. To facilitate the coordination, the photoconductor is provided with a plurality of perforations, not shown, along one of its edges, and with suitable means 75 for sensing the perforations. Similar sensors are provided in the copy path. In this manner input signals can be generated to which the LCU can respond for sequentially actuating and de-actuating the work stations as well as for controlling the operation of many other machine functions. A more complete description of means for coordinating operations in a convenience copier are disclosed in U.S. Pat. No. 3,914,047, entitled SYNCHRONIZING CONTROL APPARATUS FOR ELECTROPHOTOGRAPHIC APPARATUS UTILIZING DIGITAL COMPUTER and issued in the name of William E. Hunt, Jr., et al on Oct. 21, 1975; and in U.S. application Ser. No. 671,865, entitled ORIGINAL DOCUMENT REARRANGEMENT APPARATUS FOR USE IN RECIRCULATING FEEDERS, filed in the name of Michael G. Reid, et al. on even date herewith, now Defensive Publication No. T957,006, published Apr. 5, 1977. This patent and application hereby are incorporated by reference into the present application.

The logic and control unit could be implemented by numerous suitable mechanisms such as relays, transistors, or small and medium scale digital integrated circuits. In this particular embodiment, a microcomputer 76 is utilized.

Figure 2:
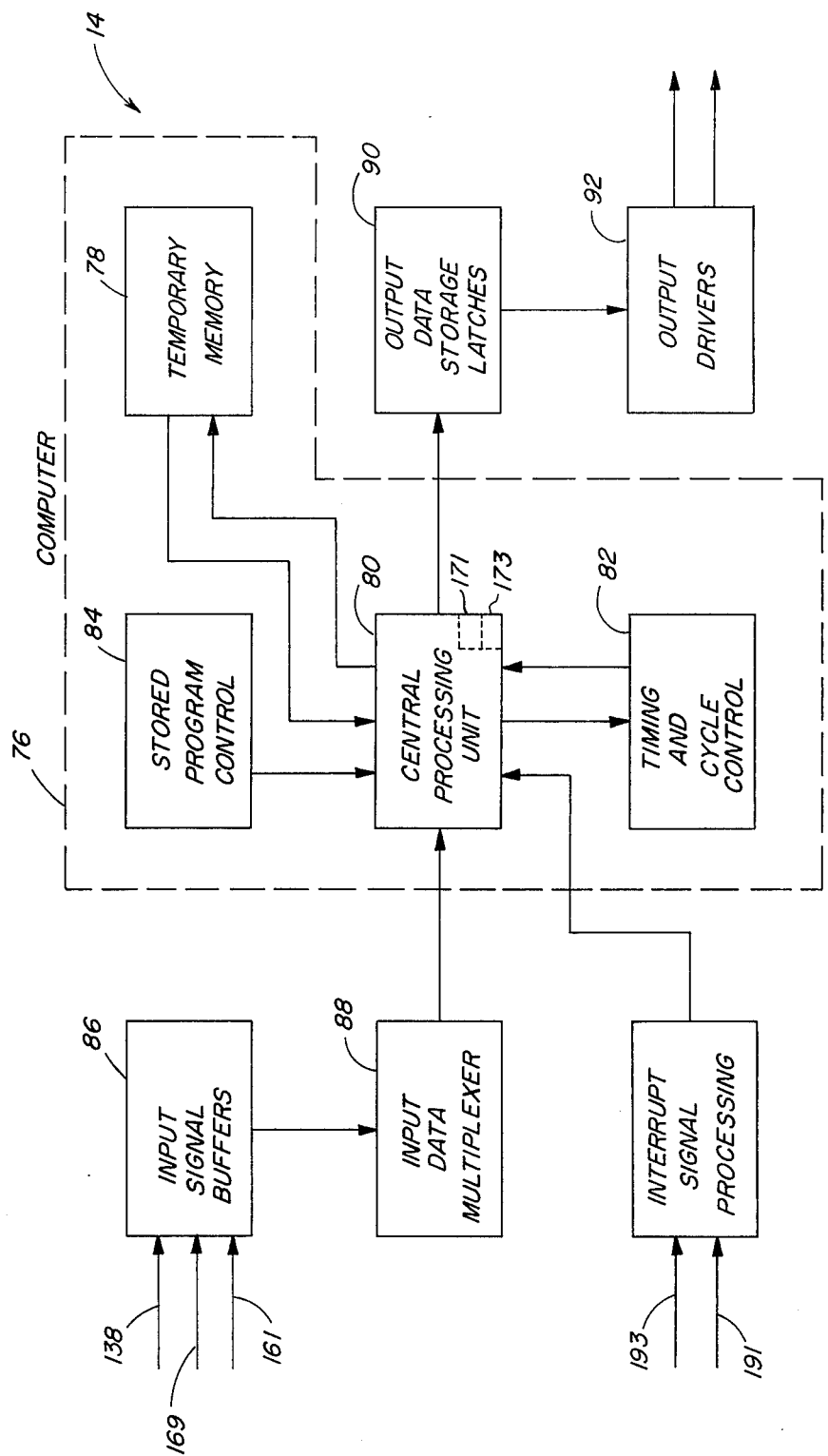
FIG. 2 is a more detailed schematic representation, in the nature of a block diagram, of the logic and control unit of FIG. 1.

Turning now to FIG. 2, a block diagram of a typical logic and control unit (LCU) 14 is shown which interfaces with the copier 10 and the feeder 12. The LCU 14 consists of temporary data storage memory 78, central processing unit 80, timing and cycle control unit 82, and stored program control 84. Data input and output is performed sequentially under program control. Input data is applied through input signal buffer 86 to a multiplexer 88. The input signals to the signal buffer 86 consist of logic level digital signals which are derived from various switches, sensors, and analog-to-digital converters. Input data also is applied from the perforation sensing means 75 through leads 191 and 193 to an interrupt signal processing means and then to the central processing unit 80. The output data and control signals are applied to storage latches 90 which provide inputs to suitable output drivers 92 directly coupled to leads which, in turn, are connected to the work stations. More specifically, the output signals from the LCU 14 are logic level digital signals which are buffered and amplified to provide drive signals to various clutches, brakes, solenoids, power switches, and numeric displays in the various copier work stations and the feeder. The LCU processing functions can be programmed by changing the instructions stored in the computer memory. This programming technique provides a flexible machine logic and timing arrangement and extends the LCU capability to include the capacity for performing error diagnostics. For example, if an input signal is not delivered to the LCU at the appropriate time, the LCU can display an ERROR code on the control panel or shut down the machine operation. The ERROR code indicates a machine failure. During a copy cycle, the LCU executes the stored program which controls the processing of signal inputs to the LCU and initiates turn ON, turn OFF, and timing of output control signals.

The time sequence of machine control signals (often referred to in the art as events) is critical to the copy cycle because the copier and feeder stations and associated mechanisms must be powered ON and OFF in the correct sequence to assure high quality copying and to prevent paper misfeeds, misregistration, and erratic operation. The primary purpose for controlling the time sequence of events and their relationship to each other is, as noted above, to sense perforations which correspond to the location of the image frames on the photoconductor as these elements continue through the cycle in an endless path. For example, the photoconductor may be divided into six image areas by one set of perforations (F perforations); and each image area may be subdivided into another set of perforations (C perforations). These F and C perfs (not shown) are described in the above-mentioned U.S. Pat. No. 3,914,047. As previously mentioned, these sets of perforations are detected by the sensing means 75 (FIG. 1), and related signals are furnished to the LCU by leads 191 and 193.

Returning now to the computer, the program 84 may be embodied by a Read Only Memory (ROM). The ROM contains the operational program in the form of instructions and fixed binary numbers corresponding to numeric constants. These programs are permanently stored in the ROM and cannot be altered by the computer operation.

Typically, the ROM is programmed at the manufacturer's facility, and the instructions programmed provide the required control functions such as: sequential control, jam recovery, operator observable logic, machine timing, and automatic document rearrangement. For a specific example, the total ROM capacity may be approximately 2,000 words with each word being 8 bits in length.

The temporary storage memory 78 may be conveniently provided by a conventional Read/Write Memory. For a specific example, the RAM capacity may be 256 words; each word being eight bits in length. Data such as: copy requested count, copies processed count, and copies delivered count are stored in the RAM until successful completion of a copy cycle. The RAM is also used to store data being operated on by the computer and to store the results of computer calculations.

Figure 3:
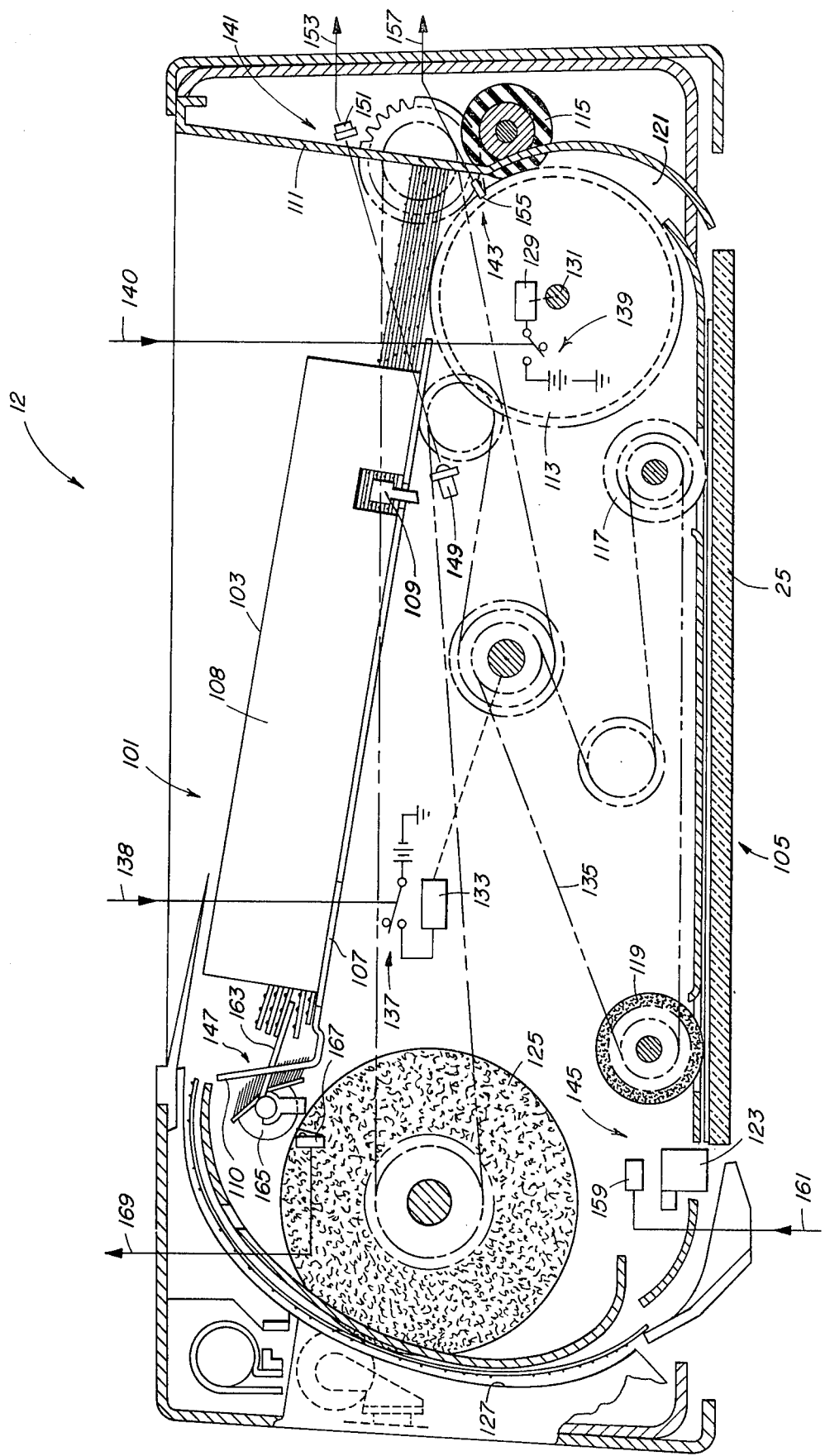
FIG. 3 is a schematic front elevation view depicting in more detail the recirculating collating feeder.

The preferred embodiment of feeder 12 is depicted in FIG. 1 as it might be positioned overlying platen 25, and in FIG. 3 as it might appear with its front cover removed. In operation a document or other original comprising a set of individual sheets is circulated and recirculated one-sheet-after-another for presentation to the copier one-sheet-at-a-time. Each sheet is circulated or recirculated and presented only once for each exposure and the entire set is circulated or recirculated once for each copy. In addition, the sheets are maintained and presented for copying in their original order. In this arrangement multiple copies of multi-page documents and other originals can be produced in a manner that facilitates collation of the final copies. Moreover, collated copies can be generated on-line from the copier without a sorter or collater, and the copies can be delivered ready for stapling, stacking or other finishing operations. Synchronization of these additional functions, as well as the copier and feeder can be provided by the LCU.

The original sheets are cycled seriatim from a storage section 101, including a stationary supply hopper 103, through an exposure position 105 spaced from the storage section, and then back to the storage section 101. The sheets are removed one-after-another in order from the bottom of the set, and returned each on top of previously returned sheets to maintain their beginning order. The entire set is presented for copying once, once again, and again and again to produce the multiple copies, with the number of presentations equalling the desired number of copies.

The supply hopper 103 is defined by a downwardly sloping supporting tray 107 and side plates 108, and further includes appropriate side and end joggers 109 and 110, respectively, which assist in maintaining the original sheets against a forward aligning wall 111.

A rotatably supported vacuum pick-off cylinder 113 extends partially into the space between the floor tray and the wall plate and oscillates for removing the sheets one-after-another from the hopper. The cylinder includes a series of air intake ports and relies on a vacuum for drawing air across the leading edges of the sheets to peel away the leading edge of the bottommost sheet and adhere it to the cylinder. The cylinder then rotates clockwise (FIG. 3) to draw the sheet out of the set and deliver it downstream where its movement is continued by other feeding devices, 115, 117 and 119, which permit return of the vacuum cylinder to pick-off the next successive sheet.

Feeding device 115 grasps the sheet and moves it through an arcuate channel 121 leading to the exposure station 105 and platen 25. Feeding devices 117 and 119 then take over to push the sheet into a registered position on the platen against a gate or pad 123. At this point further movement of the sheet is arrested temporarily to facilitate copying.

After the sheet is copied once, the registration gate is withdrawn and the sheet is returned to its original set by previously mentioned devices 117 and 119, and by a suitable additional sheet driver 125 and channel 127.

The pick-off device selectively is oscillated by a motor and clutch 129 acting through shaft 131. The various sheet driving and feeding devices, on the other hand, selectively are driven by motor and clutch 133 acting through belt 135. In accordance with the preferred embodiment, the driving and feeding devices 115, 117, 119 and 125 operate continuously, although the rollers 117 and 119 may slip in engagement with the document sheets when the sheets momentarily are arrested for exposure. Such continuous operation reduces the mass that must be accelerated whenever movement of the original sheet is interrupted for exposure.

The feeder is capable of presenting original sheets at a rate faster than the copier can make the exposures. It is not necessary, therefore, to drive the copier functions in response to feeder timing. Instead, it is the feeder that is responsive to copier timing. After one exposure the next successive original sheet is removed from hopper 103 and delivered to platen 25, in registration against pad 123, before the copier has recycled for the next exposure. Then, when the copy cycle is completed, the exposure occurs, pad 123 is removed, and a new sheet is delivered for immediate exposure as soon as the copier recycles.

Further details of the above-described portions of feeder 12 are set forth more fully in beforementioned U.S. application Ser. No. 523,610, and its continuation application Ser. No. 647,683, which are incorporated into the present application by reference.

Referring now more specifically to the control aspects of the feeder, and to its various elements employed for the detection and handling of multiple feeds, FIG. 3 depicts first and second actuating switches 137 and 139, two sheet sensing switches 141 and 143, a solenoid and switch 145, and a set-completed detector 147.

The first and second actuating switches operate independently in response to control signals from LCU leads 140 and 138 for selectively coupling the respective motors 129 and 133 to suitable sources of potential, thus causing the motors to operate as desired.

Sheet or document sensor 141 includes a light emitting diode (LED) 149 and an electric eye or photocell 151. The photocell is positioned to receive energy from the diode when the supply hopper is empty. When one or more original sheets are in the hopper, on the other hand, the eye is blocked, and this information is transmitted to the LCU via lead 153.

Sheet sensor 143 includes a microswitch 155 adjacent feeding roller 115. Whenever document sheets pass this switch the switch closes and sends a signal representing a logic "1" to LCU 14 via lead 157. Otherwise, i.e. when there is no sheet adjacent the switch, the signal represents a logic "0."

The solenoid and switch 159 is actuated through lead 161 and operates to remove and reposition the pad 123 in response to a signal from LCU 14.

Set-completed detector 147 includes a separator member 163 which extends into the supply hopper 103 for separating the set of original sheets into those which have been exposed and those which remain to be exposed. The separator member is fixed to a rotatably support shaft of a tendency drive motor 165. As the sheets are fed in succession from the set to the exposure platen and returned singly to the top of the set, the separator member rotates incrementally in a clockwise direction until the last sheet is removed. It then drops through an opening in tray 107 and rotates under the influence of the tendency drive until it is shut-off or returns to its position on top of the original set. During this rotation, the separator member actuates a micro switch 167 which provides a pulse through line 169 for indicating to the LCU that a set of original sheets has been copied once. The computer counts and totalizes the number of copy sets which have been made. At the end of the copy job, the computer recognizes concurrence between the number of sensed switch actuations and the number of copies requested, and, after the last sheet to be exposed is returned the feeder 12 is deactivated.

Figure 4:
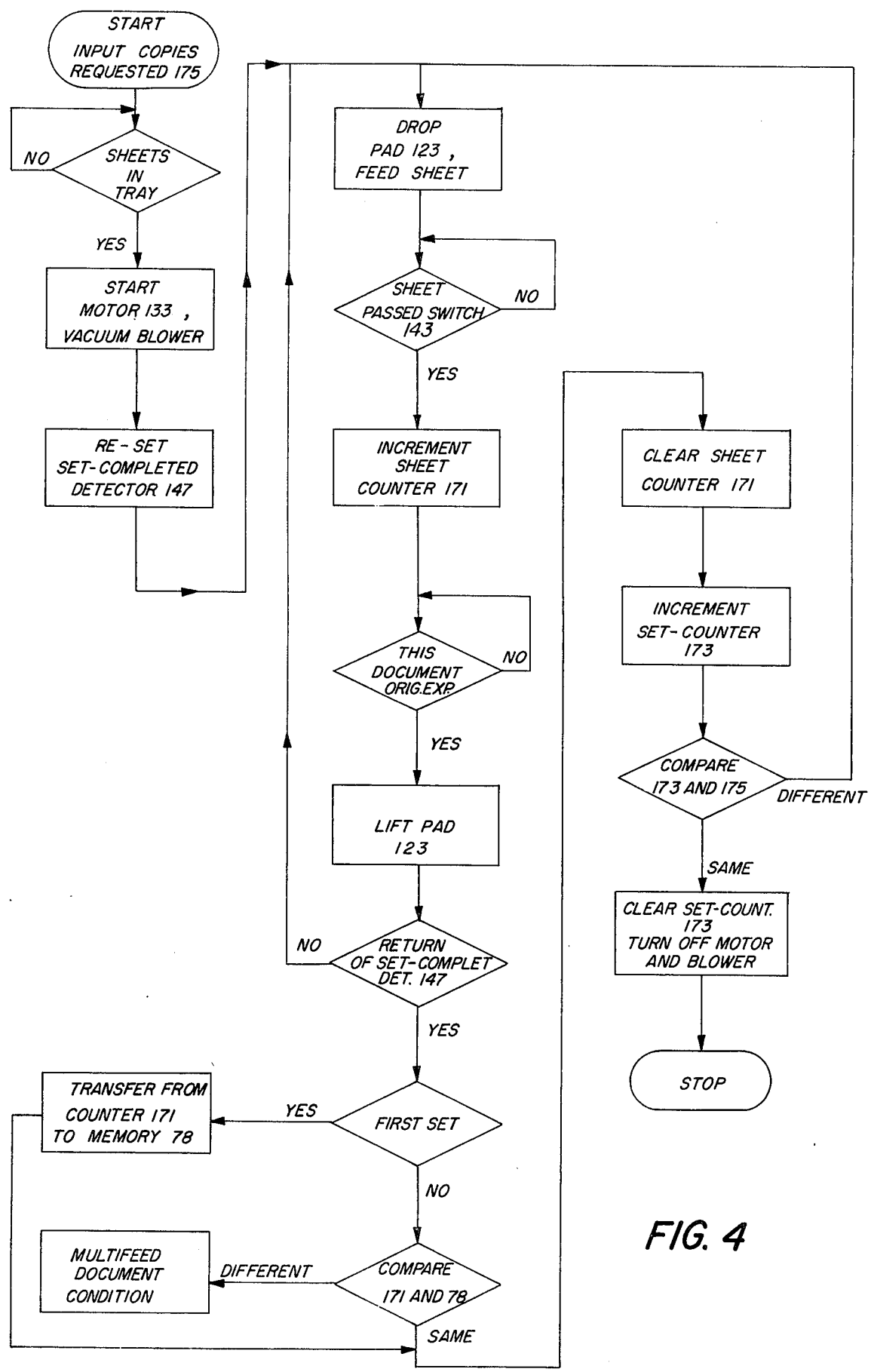
FIG. 4 is a simplified flow chart presenting a logical sequence in which the apparatus of the present invention might operate.

Referring now to FIG. 4, a flow chart is presented which represents a logical operation for the feeder 12. After the start button is depressed, the LCU will determine if an original is in position for feeding by sampling the lead 153 connected to photocell 151. Upon finding the appropriate signal for "original present" the LCU will send a pulse through line 138, closing switch 137 and energizing both the motor 133 and the vacuum source for the pick-off device. Next the LCU will energize the tendency drive for the set-completed detector 147 so that its separating member 163 will rotate into position overlying the top of the original. Then the LCU sends appropriate pulses through leads 161 and 140, respectively, to drop the registration gate or pad 123 and to initiate oscillation of the pick-off cylinder 113. This brings about the removal of the bottom-most sheet from the original set, and its presentation on the platen against the registration gate in position for copying.

At the appropriate time as determined by the perforations in the photoconductor, the LCU interrogates lead 157 to determine when the removed sheet passes switch 143. At that time, i.e. when the sheet passes the switch, the LCU increments a sheet counter 171, which keeps track of the number of times sheets are presented for copying.

Using the perforations in the photoconductor again, the LCU determines the appropriate time for actuating the copier to expose the original sheet, and then pulses line 161 to remove the registration gate or pad 123. This permits continued movement of the sheet, which has now been exposed, through the exposure station and back to the supply hopper.

The LCU next interrogates line 169. Assuming that the separator member is blocked by sheets in the original set that have not yet exposed, the LCU will return to the appropriate point in its program, as described above, for circulating the next sheet, and so forth, until all the sheets have been copied. Then, however, the separator member will no longer be blocked and will actuate the switch 167 to let the computer know that copying of the set has been completed once.

After, the first set is completed, the information in sheet counter 171, representing the number of times sheets were presented for copying, is transferred to memory 78. The sheet counter also is cleared, a set counter 173 is incremented, to keep track of the number of set copies made, and that number (173) is compared to the number of set copies requested (175).

Assuming a plurality of set copies was requested, the LCU will return to the appropriate point in its program, as described above, for recirculating and copying the set a second time, beginning again with the bottom-most sheet.

This process continues until the number in set counter 173 equals the number of sets requested, at which time the feeder will be shut down. On completion of the second and each subsequent set (recirculations or representations of the original set), however, the number in sheet counter 171 is compared to the number transferred to memory 78. When these numbers are the same, operation of the feeder continues without interruption. When they differ, a multiple feed is indicated and the LCU then establishes a readily apparent signal or condition that warns of the undesired multi-feed event. Preferrably, further operation of the feeder is discontinued by, for example, the computer 76 opening switches 137 and 139.

The above description has been simplified somewhat to clarify these aspects which are most pertinent to the present invention. Further details are set forth in commonly assigned copending U.S. application Ser. No. 671,865, entitled ORIGINAL DOCUMENT REARRANGEMENT APPARATUS FOR USE IN RECIRCULATING FEEDERS, filed in the name of Michael G. Reid, et al on even date herewith, now having been converted to Defensive Publication No. T957,005, published Apr. 5, 1977, and incorporated by reference into the present application.

It should now be apparent that the present invention detects multiple feeds by comparing the number of times sheets are presented to the copier when the set of originals is copied once, with the number of times sheets are presented to the copier when the set of originals is copied again. When a multiple feed occurs, these numbers will differ, since some presentation will include more than a single sheet. Thus, even though every sheet may be circulated every time, so the number of sheets moving in the cycle will be equal each time, the number of presentations will differ when there is a multiple feed, assuming, of course that the multiple-feed condition does not persist through more than one circulation.

The preferred embodiment uses the sensing switch 143 and sheet counter 171 for determining the number of presentations. It uses the non-counting, set-completed detector 147 for initiating the comparison of presentations between copies and the initialization of the sheet counter between sets. The multiple feed event, when it occurs, is indicated by a shut down of the feeder.

Other embodiments not illustrated in the present application might determine the number of presentations, for example, by counting the number of flash exposures for a circulation and a recirculation or by measuring the time for a circulation and recirculation.

The invention has been described in detail with particular reference to preferred embodiments thereof, but it will be understood that variations and modifications can be effected within the spirit and scope of the invention.

We claim:

1. In a document feeder for presenting and representing a document, defined by a set of sheets, to a convenience copier; the feeder including sheet handling means for once presenting the set one-sheet-at-a-time to the copier and for once again presenting the set one-sheet-at-a-time to the copier; the improvement comprising:
   means for comparing the number of times sheets are presented to the copier when the set is once presented, with the number of times sheets are presented to the copier when the set is once again presented; and
   means for establishing an apparent first condition when the number of times once presented equals the number of times once again presented, and a second apparent condition different from the first condition when the number of times once presented differs from the number of times once again presented.

2. In a collating feeder, for presenting an original, defined by a set of original sheets, to a convenience copier; the feeder including sheet handling means for once presenting the set of original sheets one-at-a-time to the copier and for once again presenting the set of original sheets one-at-a-time to the copier; the improvement comprising:
   means for counting the number of presentations of the sheets when the set is once presented and for counting the number of presentations of the sheets when the set is once again presented; and
   means for comparing the number of once presentations with the number of once again presentations, and for establishing an apparent signal suitable for warning when the number of once presentations differs from the number of once again presentations.

3. In a document feeder for presenting a document, defined by a set of individual sheets, to a convenience copier for copying, the feeder including sheet handling means for presenting the set of sheets one-sheet-at-a-time to the copier and for re-presenting the set of sheets one-sheet-at-a-time to the copier;
   means for determining the number of times sheets are presented to the copier and for determining the number of times sheets are re-presented to the copier;
   means for comparing the number of presentations with the number of re-presentations, and for establishing when the number of presentations differs from the number of re-presentations; and
   means for warning when the number of presentations differs from the number of re-presentations.

4. A document feeder for presenting and representing a document, defined by a set of individual sheets, for copying; said feeder comprising:
   means defining an exposure position where the document sheets are presentable one-sheet-at-a-time for copying;
   sheet handling means for cycling the set of sheets one-sheet-after-another through said exposure position, and for recycling the set of sheets one-sheet-after-another through said exposure position, thereby to present the set of sheets once and once again for copying; and
   means for establishing an error signal indicating whenever the number of sheets presented when cycling the set through said exposure position differs from the number of sheets presented when recycling the set through said exposure position.

5. A collating feeder for producing a desired plurality of copies by presenting an original to a convenience copier, the original defined by a set of individual sheets, said feeder comprising:
   means defining an exposure position where the original sheets are presentable for copying one-sheet-at-a-time;
   means for circulating the set through said exposure position a number of times, including a first time and a second time, equal to the desired number of copies in a manner suitable for collating the copies, said circulating means including sheet handling means for presenting the sheets seriatim to said exposure position; and means for establishing an error signal indicating whenever the number of presentations of sheets the first time differs from the number of presentations of sheets the second time.

6. A collating feeder for presenting an original for copying, the original including a set of individual sheets; said feeder having a feeding condition and a non-feeding condition, and comprising:
   a storage section for receiving the set of original sheets stationary;
   means defining an exposure position, spaced from said storage section, where the original sheets are presentable for copying;
   sheet handling means for circulating the set a first time, one-sheet-after-another, from said storage section to said exposure position and back to said storage section, and for circulating the set a second time, one-sheet-after-another, from said storage section to said exposure position and back to said storage section, thereby to present the sheets a plurality of times for copying in a manner suitable for collating the copies;
   means for counting the number of presentations the first time and the number of presentations the second time and for establishing an error signal when the number of presentations the first time differs from the number of presentations the second time; and
   means for switching said feeder from the feeding condition to the non-feeding condition in response to said error signal.

7. A collating feeder for prestating an original for copying, the original including a set of individual sheets; said feeder comprising:
   a storage section for receiving and supporting the set of original sheets stationary;
   means defining an exposure position, spaced from said storage section, where the original sheets are presentable for copying;
   sheet handling means for circulating the original sheets, one-after-another, from said storage section to said exposure position and back to said storage section, and for recirculating the original sheets, one-after-another, from said storage section to said exposure position and back to said storage section, thereby to present the set of sheets once and once again for copying; and
   multi-feed detection means, said means including:
      a memory for storing a count;
      an incremental counter and means for incrementing said counter each time original sheets circulate or recirculate;
      means for determining, other than by counting, the event of a complete set circulation and a complete set recirculation, said determining means, upon determining the circulation event, transferring the count in said counter to said memory for storage, and resetting said counter, said determining means, upon determining the recirculation event comparing said stored count with said counter count; and
      means for signalling when said stored count differs from the compared counter count.

8. A convenience copier for producing collated copies of an original, the original including a set of individual sheets, the copies including a plurality of copy-supports; said copier comprising:
   an exposure platen for receiving original sheets one-at-a-time to be copied;
   a process section for establishing visible representations of original sheets on said exposure platen, one-representation-after-another;
   means for feeding copy supports to said process section one-after-another for receiving the visible representations from said process section, said feeding means delivering each of the copy supports on top of any previously delivered supports;
   a feeder for circulating and recirculating the set of original sheets for presentation to said exposure platen one-after-another in a manner suitable for collating the copies;
   means for determining when the number of presentations on circulating the set differs from the number of presentations on recirculating the set; and
   means for establishing an error signal when the number of circulating presentations differs from the number of recirculating presentations.

* * * * *